United States Patent
Eriksen

(10) Patent No.: US 9,188,106 B2
(45) Date of Patent: Nov. 17, 2015

(54) WIND TURBINE

(75) Inventor: Uffe Eriksen, Horsens (DK)

(73) Assignee: SIEMENS AKTIENGESELLSCHAFT, München (DE)

(*) Notice: Subject to any disclaimer, the term of this patent is extended or adjusted under 35 U.S.C. 154(b) by 587 days.

(21) Appl. No.: 13/634,639

(22) PCT Filed: Mar. 11, 2011

(86) PCT No.: PCT/EP2011/053664
§ 371 (c)(1),
(2), (4) Date: Nov. 21, 2012

(87) PCT Pub. No.: WO2011/117082
PCT Pub. Date: Sep. 29, 2011

(65) Prior Publication Data
US 2013/0195656 A1    Aug. 1, 2013

(30) Foreign Application Priority Data

Mar. 26, 2010 (EP) ..................... 10157903

(51) Int. Cl.
| | |
|---|---|
| *F03D 11/00* | (2006.01) |
| *F03D 1/06* | (2006.01) |
| *F03D 7/02* | (2006.01) |
| *H02K 7/18* | (2006.01) |
| *H02K 11/00* | (2006.01) |

(52) U.S. Cl.
CPC .............. *F03D 11/00* (2013.01); *F03D 1/065* (2013.01); *F03D 7/0224* (2013.01); *H02K 7/1838* (2013.01); *H02K 11/0021* (2013.01); *H02K 11/0026* (2013.01); *F05B 2220/7066* (2013.01); *F05B 2270/326* (2013.01); *F05B 2270/809* (2013.01); *H02K 11/0015* (2013.01); *H02K 2213/06* (2013.01); *Y02E 10/721* (2013.01); *Y02E 10/723* (2013.01); *Y02E 10/725* (2013.01)

(58) Field of Classification Search
CPC ....... F03D 1/065; F03D 7/0224; F03D 11/00; F05B 2220/7066; F05B 2270/326; F05B 2270/809
See application file for complete search history.

(56) References Cited

U.S. PATENT DOCUMENTS

| | | | |
|---|---|---|---|
| 4,503,673 A | * | 3/1985 | Schachle et al. ............... 416/41 |
| 8,970,059 B2 | * | 3/2015 | Russ et al. ...................... 290/52 |
| 2010/0052325 A1 | * | 3/2010 | Perner et al. .................... 290/52 |

FOREIGN PATENT DOCUMENTS

| | | |
|---|---|---|
| CN | 101473135 A | 7/2009 |
| DE | 20317749 U1 | 3/2005 |
| GB | 939507 A | 10/1963 |
| TW | 200835852 A | 9/2008 |
| WO | WO 2008000882 A1 | 1/2008 |
| WO | WO 2009058022 A1 | 5/2009 |

* cited by examiner

*Primary Examiner* — Igor Kershteyn

(57) ABSTRACT

Disclosed is a wind turbine with a nacelle and a rotor. The rotor includes a number of blades and a hub, the nacelle and the hub being connected with each other in an interface region so that a drive train extends from the hub into the nacelle. The wind turbine further includes a transport system for transporting hydraulic and/or pneumatic fluid from the nacelle into the hub. The transport system includes a rotary unit as a connection through which the fluid passes a part of which rotary unit rotates in operation together with the hub which rotary unit is positioned in the interface region. Further disclosed is a transport system and methods of operating, maintenance and construction of such wind turbine.

10 Claims, 3 Drawing Sheets

WIND TURBINE

CROSS REFERENCE TO RELATED APPLICATIONS

Figure 1:
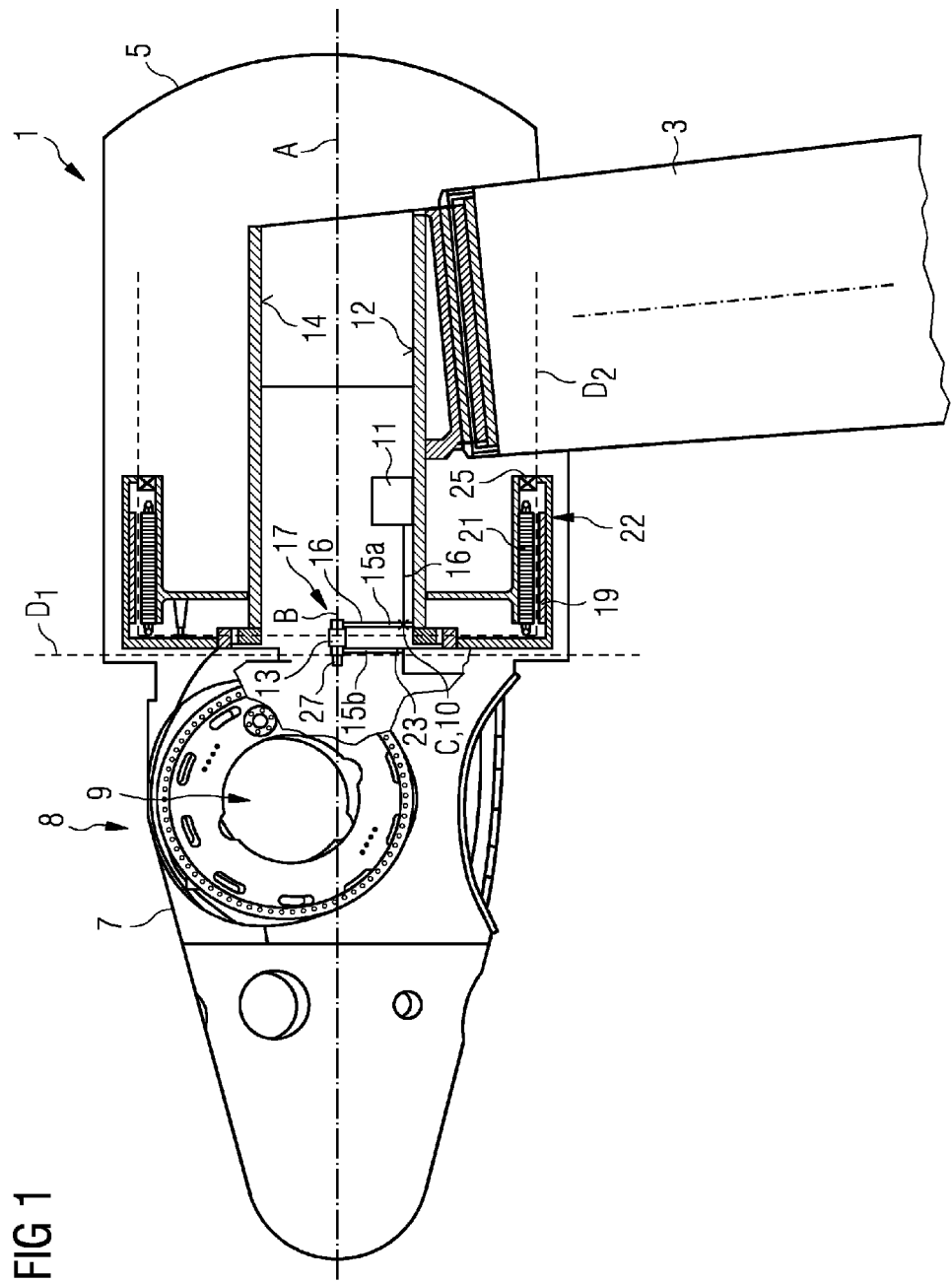

This application is the US National Stage of International Application No. PCT/EP2011/053664, filed Aug. 11, 2011 and claims the benefit thereof. The International Application claims the benefits of European application No. 10157903.5 EP filed Mar. 26, 2010. All of the applications are incorporated by reference herein in their entirety.

FIELD OF THE INVENTION

The invention relates to a wind turbine with a nacelle and a rotor, the rotor comprising a number of blades and a hub, the nacelle and the hub being connected with each other in an interface region so that a drive train extends from the hub into the nacelle. The wind turbine further comprises a transport system for transporting hydraulic and/or pneumatic fluid from the nacelle into the hub. The invention also relates to methods of operation, maintenance and construction of such a wind turbine.

BACKGROUND OF THE INVENTION

Today's wind turbines, in particular large scale wind turbines with power outputs in the scale of above 1 MW, are very complex systems. Despite their large size, their operational state needs to be adaptable to current weather conditions, in particular wind conditions. For that purpose, the position of the rotor blades of the rotors of such wind turbines can be adapted. A so-called pitch control system allows for positioning the rotor blades against the wind by rotating the blades around their longitudinal axis. Thus, the rotational speed of the rotor can be controlled and a maximum power output can be achieved.

The usual way of pitch control of the rotor blades is by using an electric pitch control system in which electric engines control the pitch of the blades. However, it has been wished for to use hydraulic pitch systems (or pneumatic pitch systems—which are also summarized under the expression "hydraulic pitch system" in the context of this application) rather than electric ones. Such hydraulic systems are often easier to control and they also still function in the case of an interruption of power output of the generator of the wind turbine because they are not directly dependent on electric power supply by the wind turbine itself. In order to drive such hydraulic pitch systems it is necessary to have a transport system which transports a hydraulic and/or pneumatic fluid (such as hydraulic oil, water or any other liquid or gas) into the pitch control system in the hub under a certain pressure. In other words, the hydraulic and/or pneumatic fluid is put under a certain pressure by means of a pump and lead to a distribution block, to blade blocks and accumulator blocks which are all located inside the hub in close proximity to the rotor blades.

The transport of this pressurised hydraulic and/or pneumatic fluid, however, has proven to be quite complicated. This is due to the fact that the hub rotates in operation of the wind turbine so that a solution has to be found of how the pipes of the transport system are not rotated together with the hub in such a way that they will be damaged due to torsions.

SUMMARY OF THE INVENTION

It is therefore an object of the invention to provide a possibility of supplying and/or operating a wind turbine with an enhanced transport system for transporting hydraulic or pneumatic fluid from the nacelle into the hub of the wind turbine. One particular object of the invention is also to provide such a transport system which poses a minimum obstacle to staff who want to enter the hub from the nacelle for purpose of maintenance and/or assembly of the wind turbine and thus a method of maintenance of such wind turbine with such advantageous function.

The objects of the invention are achieved by a wind turbine.

Accordingly, a wind turbine of the above-mentioned kind is equipped with a transport system which comprises a rotary unit (or rotary union) as a connection through which the fluid passes a part of which rotary unit rotates in operation together with the hub. This rotary unit is positioned in the interface region.

Rotary units can be characterized as construction elements of a transport system with a stationary (or non-rotatable) part and a rotatable (or non-stationary) part connected to each other in such way that the rotating part can rotate around a predefined rotation axis. The connection between the stationary part and the rotatable part is such that essentially no hydraulic and/or pneumatic fluid passes from the inside of the rotary unit to its outside, i.e. the inner side of the rotation unit is isolated such that it prevents a leakage. When fluid is led into the inside of the stationary part it will pass into the inside of the rotatable part and from there into other (stationary or non-stationary) parts of the transport system. The fluid can also be led into the rotatable part and pass into the stationary part. The fluid passes from the nacelle into the hub, but it can possibly also be led back into the opposite direction if needed. For instance, a pump situated in the nacelle can pump the fluid via the rotary unit into a hydraulic pitch system in the hub. The fluid may also be led back into the nacelle, for example into a reservoir in the nacelle.

The invention makes use of such a rotary unit which is specifically positioned in an interface region between the nacelle and the hub of the wind turbine. Such an interface region is situated at the inside of the wind turbine as a transition area in which both the nacelle and the hub end and which can thus be assigned either to the nacelle or to the hub, but not clearly to any of both. It is normally used in order to get from the nacelle into the hub whereas no main functional elements of the wind turbine are situated there. Such functional parts are in particular the rotor, the pitch system, a gearbox or the generator. Possibly, in the interface region a shaft of a drive train may be aligned. It may be the case that the generator is assembled around the interface region, i.e. not in the interface region, but surrounding it. This is the case if the wind turbine is a direct drive wind turbine. Generally, the interface region can be derived from the outside limits of the nacelle facing in the direction of the hub. These limits define a plane extending through the inside of the wind turbine. From this plane to either side into the nacelle and into the hub the interface region extends not more than 1 meter, preferably not more than 0.5 meters, most preferably not more than 0.3 meters. It may be noted that the outside limits of the nacelle can be defined either by the limits of its outer shell, the so-called canopy, or by the limits of the generator if the generator projects further, i.e. beyond the limits of the canopy—which can be the case in a direct drive wind turbine.

In other words, the rotary unit is positioned away from the inside of the nacelle and away from the inside of the hub but rather in between them. Due to this positioning the rotary unit does not stand in the way of operations either within the hub or in the nacelle, and in case of an operation failure hydraulic and/or pneumatic fluids will not easily be spilt at functional elements neither in the nacelle nor in the hub.

Such positioning also has the advantage that the stationary part of the rotary unit can be connected to the nacelle whereas the rotatable part of the rotary unit can be connected to the hub. Thus the stationary part of the wind turbine, i. e. the nacelle, is connected to the stationary part of the rotary unit, whereas the rotatable part of the wind turbine, i. e. the hub, is connected to the rotatable part of the rotary unit. The functions of the parts of the rotary unit match with the functions of the nacelle and of the hub respectively. Positioning the rotary unit in the region of the interface between the nacelle and the hub means that it is placed at the very location in which a separation between rotatable parts (i.e. the hub) and non-rotatable parts (i.e. the nacelle) takes place. The functional separation of the two principal parts of the wind turbine is therefore reflected by the same functional separation between the rotatable and non-rotatable part of the rotary unit. It is for that reason that any staff working in the inside of the wind turbine is fully aware of where rotatable parts are situated and where stationary parts are situated. In this context it can be neglected that certainly some rotatable parts of the wind turbine, in particular the drive train, a gearbox and a generator, are situated within the nacelle: either these rotatable parts are within a housing or their rotating function is clearly visible for any of the staff operating within the inside of the wind turbine.

Positioning the rotary unit in the interface region also makes it easier to disconnect rotatable parts of the wind turbine from non-rotatable parts of the wind turbine. Once the drive train is disconnected from the hub any other disconnections can be carried out basically along one plane which is essentially perpendicular to the axis of rotation of the rotor and which plane is exactly in the interface region mentioned above.

Apart from the warning function or the function of clear distinction between non-rotatable parts from rotatable parts of the wind turbine, there are also some additional technical advantages of this particular position of the rotary unit. Depending on the model of the wind turbine, different aspects can play a role: in a so-called indirect drive wind turbine a drive train, i.e. a rotatable shaft, is led along the axis of rotation of the hub into the inside of the nacelle. The drive train will then be led into a gearbox and further from there into a generator. In such a case, the rotary unit can be directly connected to the drive train. In contrast, in so-called direct drive wind turbines no gearbox is necessary, and from the rotating hub some parts project into the nacelle. These parts carry a rotor of a generator which is surrounded by (or which surrounds) stator coils of this generator. This stator is carried by the nacelle. In such a case the region of the interface between the hub and the nacelle is essentially hollow so that persons can pass from the nacelle into the hub easily. The drive train then comprises those parts which project from the hub into the nacelle and which are essentially formed pipe-like. Therefore, such drive train in a direct drive wind turbine can also be characterized as a communication link or communication assembly in contrast to drive trains in an indirect drive wind turbine (where the drive train comprises a number of shafts). In a direct drive wind turbine the rotary unit can be placed somewhere into the cavity formed by the rotor and the stator inside the wind turbine in the hollow space which is essentially free of any functional devices of the wind turbine.

The wind turbine according to the invention comprises a transport system. The invention therefore also concerns a transport system for transporting hydraulic and/or pneumatic fluid from a nacelle into a hub of a wind turbine, the wind turbine comprising the nacelle and a rotor, the rotor comprising a number of blades and the hub, the nacelle and the hub being connected with each other in an interface region so that a drive train extends from the hub into the nacelle, whereby the transport system comprises a rotary unit as a connection through which the fluid passes, a part of which rotary unit rotates in operation together with the hub. This rotary unit is realized and/or positioned within the transport system such that it can be positioned in the interface region. Such transport system can be used in order to reequip existing wind turbines in order to produce a wind turbine according to the invention. The realization and/or positioning of the wind turbine is carried out such that in dependence of the wind turbine which is to be equipped, the rotary unit is assembled along the transport system at such a distance that permits that it can be installed far enough away from the pitch system of the hub to be positioned in the interface region. For instance, if the transport system comprises a pipe system which is to extend from the pitch system in the direction of the nacelle, such pipe system will have a length permitting to reach the interface region and will then end in the rotary unit. One can also calculate distance from the other side, i.e. from the nacelle: The way from a reservoir and/or pump positioned in the nacelle has to be bridged by a pipe system which is dimensioned as long to extend to reach the interface region. There, the rotary unit is connected to the pipe system.

In accordance with the characteristics of the wind turbine according to the invention of the method according to the invention is characterized by the fact that the transport system used comprises a rotary unit as a connection through which the fluid passes and a part of which rotates together with the hub which rotary unit is positioned in the interface region. In other words, use is made of the same rotary unit (and transport system) as just described above for operation of a wind turbine of the above-mentioned kind.

A method of construction of a wind turbine according to the invention includes the step of equipping the wind turbine with a transport system for transporting hydraulic and/or pneumatic fluid from the nacelle into the hub, which transport system comprises a rotary unit as a connection through which the fluid passes and a part of which rotates in operation together with the hub which rotary unit is positioned into the interface region.

The invention also concerns a method of maintenance of such a wind turbine. Again, the transport system used comprises a rotary unit as a connection through which the fluid passes and a part of which rotates in an operational mode of the wind turbine together with the hub. Further, during maintenance the rotary unit is moved away from the axis of rotation of the drive train (i.e. of the rotor of the wind turbine) so as to permit easier access from the nacelle into the hub. While during operation of the wind turbine for generating power, the position of the rotary unit somewhere in the area of the axis of rotation of the drive train of the wind turbine does not place any obstacle to operation, it will hinder staff in the case of maintenance from entering the hub from the nacelle. For that purpose, the inventors have discovered that nevertheless, the rotary unit can be placed in the area of the axis of rotation of the drive train—where it is particularly advantageous to be placed during operation of the wind turbine because it its easy to be operated there—if it is made possible to move the rotary unit away from the axis of rotation for the purpose of maintenance. Particular embodiments of rotary units and transport systems which make possible such movement of the rotary unit will be explained below.

Particularly advantageous embodiments and features of the invention are given by the dependent claims, as revealed in the following description. Thereby, features revealed in the context of the wind turbine may also be realized in the context of any of the methods according to the invention and vice versa.

It is particularly advantageous if the wind turbine is realized as a direct drive wind turbine with a drive train directly connecting the rotor with a generator. Such direct connection between the rotor and the generator means that no gearbox is used (as explained above). Rather, the rotation of the rotor of the wind turbine is directly transferred into the generation of electric energy. Such construction is particularly advantageous in the context of the invention because its advantages can be used to their full extent: whereas it is possible to lead pipes of a transport system for hydraulic and/or pneumatic fluids through the drive train, i.e. a shaft, of an indirect-drive wind turbine, such shaft does not exist in direct drive wind turbines. Therefore, the problem of transferring the hydraulic and/or pneumatic fluid from the nacelle into the hub is particularly difficult to solve in the case of direct drive wind turbines.

In this context, but also the context of indirect drive wind turbines, it is particularly advantageous if in operation of the wind turbine the rotation axis of the rotary unit is positioned at a rotation axis of the drive train. That way it can be realized that the rotatable part of the rotary unit is rotated along the same rotation axis as the drive train whereas the stationary part can remain in its position all throughout the operation of the wind turbine (however not necessarily during maintenance, as will be explained below).

It is further preferred to connect the rotary unit to the nacelle and/or to the hub by means of at least one spacer which projects from a fixed point at the nacelle and/or at the hub to the rotation axis of the drive train.

Such fixed point at the nacelle may be a part of the inner surface of the nacelle and/or the hub, for instance on a floor in the inside of the nacelle and/or the hub. The spacer may also be attached to a ceiling part inside the nacelle and/or the hub and thus project from above down to the rotation axis of the drive train. Other possibilities include spacers which project from side walls of the nacelle and/or the hub. Such spacers may be orientated essentially perpendicularly to the rotation axis of the drive train, but can also be positioned at a different angle. An essentially perpendicular orientation has the advantage that a very small amount of space within the nacelle and/or the hub is occupied by the spacer(s). Positioning a spacer at a different angle may have the advantage of using the special circumstances of a particular outlet of wind turbine in which perpendicular orientations may not be impossible (for instance due to other objects being in the way). It may also provide a more stable arrangement for holding the rotary unit. One spacer may also comprise more than one leg, the legs preferably being orientated at an angle to each other. This can also provide for a higher stability for holding the rotary unit.

It is particularly advantageous is the spacer comprises a solid part, preferably if the spacer is overall so solid that in a normal operation mode of the wind turbine it will not bend to more than 10% of its original shape. This provides for a stability which makes it possible that the spacer directs a pipe of the transport system to the rotary unit which is then held stably in a designated position.

Furthermore, it is preferred that the spacer is tiltable around a tilting axis which is angular to the rotation axis of the rotary unit. Such tilting axis can be realized by a hinge within the spacer and/or at an interface between the spacer and a pipe of the transport system and/or at an interface between the spacer and a fixed part of the nacelle or the hub respectively. By this means, the rotary unit can be moved from an operating position into a standby position in which latter it does not stand in the way of staff that want to pass from the nacelle into the hub or vice versa. That means that the rotary unit can be transferred from its operation position in which its the rotation axis corresponds to the rotation axis of the drive train of the wind turbine (by being either parallel to the latter rotation axis or by being the same rotation axis) into a different position away from the inside of the interface region. Preferably the rotary unit can be moved such that in the standby position it is close to an inner surface of the hub and/or of the nacelle, most preferably outside of the interface region.

In a state of operation of the wind turbine the spacer can be advantageously positioned at an inner surface such as a bottom floor, a ceiling or a side wall, of the nacelle and/or of the hub from where it projects (preferably in an essentially vertical way) in a direction of the rotation axis of the drive train. In contrast, in a standby position the spacer is tilted away from that operation position so that the rotary unit is removed from its operation position into the standby position in which it does not stand in the way to the same extent as in the operation position.

In general, the transport system may comprise pipes made of any material. Inflexible pipes such as metal pipes or pipes made of solid plastics may be used in particular in all those regions of the transport system which need to be protected from persons stepping onto them and/or from objects that might potentially injure them during operation or maintenance of the wind turbine. However, it is preferred that the transport system in the region of the interface comprises a flexible pipe at at least one side of the nacelle and/or the hub. Such flexibility of the pipes in that particular region makes possible that the transport system can be moved to a certain extent, for instance in order to permit for tilting away a spacer inside of which and/or along which the pipes of the transport system are led.

Thus, it is further preferred that the flexible pipe is led through at least one spacer which projects from a fixed point at the nacelle and/or at the hub into the direction of the rotation axis of the drive train. For that purpose the spacer may e.g. have a cylindrical hollow shape inside of which the flexible pipe is placed. The shape of the spacer may however also be open at at least one side along its longitudinal extension, at least partially. For instance, it may have a U-shaped cross section with reference to its longitudinal extension but also an L-shaped cross section. Leading the pipe through such a shape may include fixing that pipe in regions in which the cross section is at least partially open at one side. This can for instance be realized by brackets bridging the gap caused by the opening in the cross-section of the spacer.

When using a flexible pipe as part of the transport system in the region of the interface, a movement of the rotary unit from an operation position into a standby position is possible without disconnecting parts of the transport system. As an alternative or as an add-on possibility the transport system can be realized in such a way that it comprises a coupling in the region of the interface which coupling can be connected and disconnected. When the rotary unit is moved from its operation position into the standby position, the transport system can then be disconnected. Analogously, when the rotary unit is put back into the operation position the transport system can be reconnected along the coupling mentioned above. Not only does this simplify the movement of the rotary unit, but it also permits for an additional safety in that sense that once the rotary unit is removed from its operation position no hydraulic and/or pneumatic fluid can be transported from the nacelle into the hub (and back). This has the effect of an automatical switch-off of the operation of the pitch system during maintenance works in the hub and/or the nacelle. Such a coupling preferably comprises closing means for firmly closing the transport system in the region of the coupling in case the coupling is disconnected. This provides for a safe mechanism which means that upon disconnecting the coupling no hydraulic fluid will leave the transport system uncontrolledly.

The rotary unit can also have additional functions, in particular it can be used as a fixing point for additional devices which may also need to be placed in the interface region of the wind turbine: a preferred embodiment therefore is realized such that in the region of the rotary unit, an additional unit with a designated function different from the function of the rotary unit is directly or indirectly attached to the rotary unit. For instance, the additional unit may comprise a rotation sensor for sensing the rotation speed and/or torque and/or the rotation momentum of the hub and thus of the drive train of the wind turbine and/or a slip ring for electric cables.

Other objects and features of the present invention will become apparent from the following detailed descriptions considered in conjunction with the accompanying drawings. It is to be understood, however, that the drawings are designed solely for the purposes of illustration and not as a definition of the limits of the invention.

Figure 2:
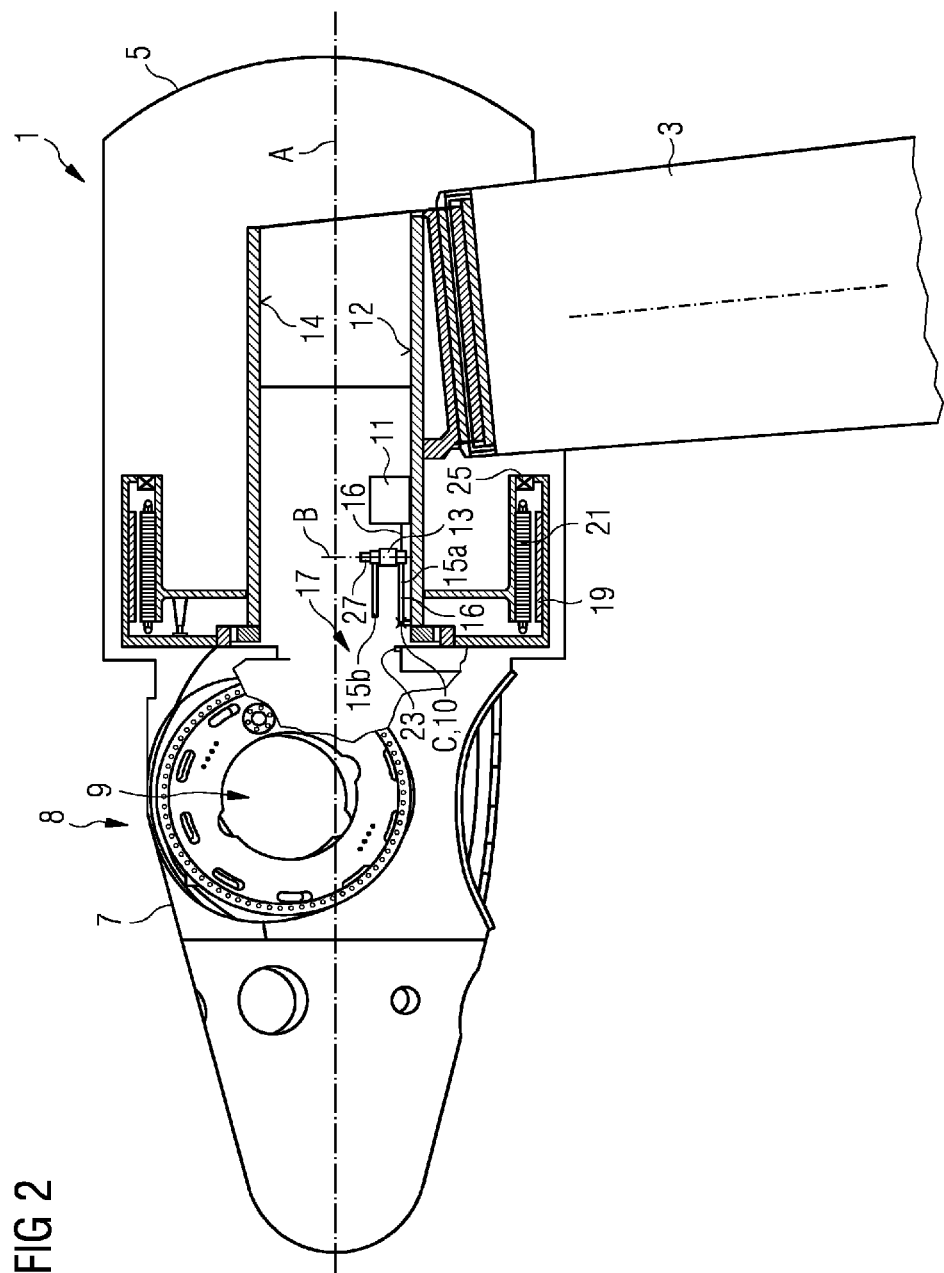
Figure 3:
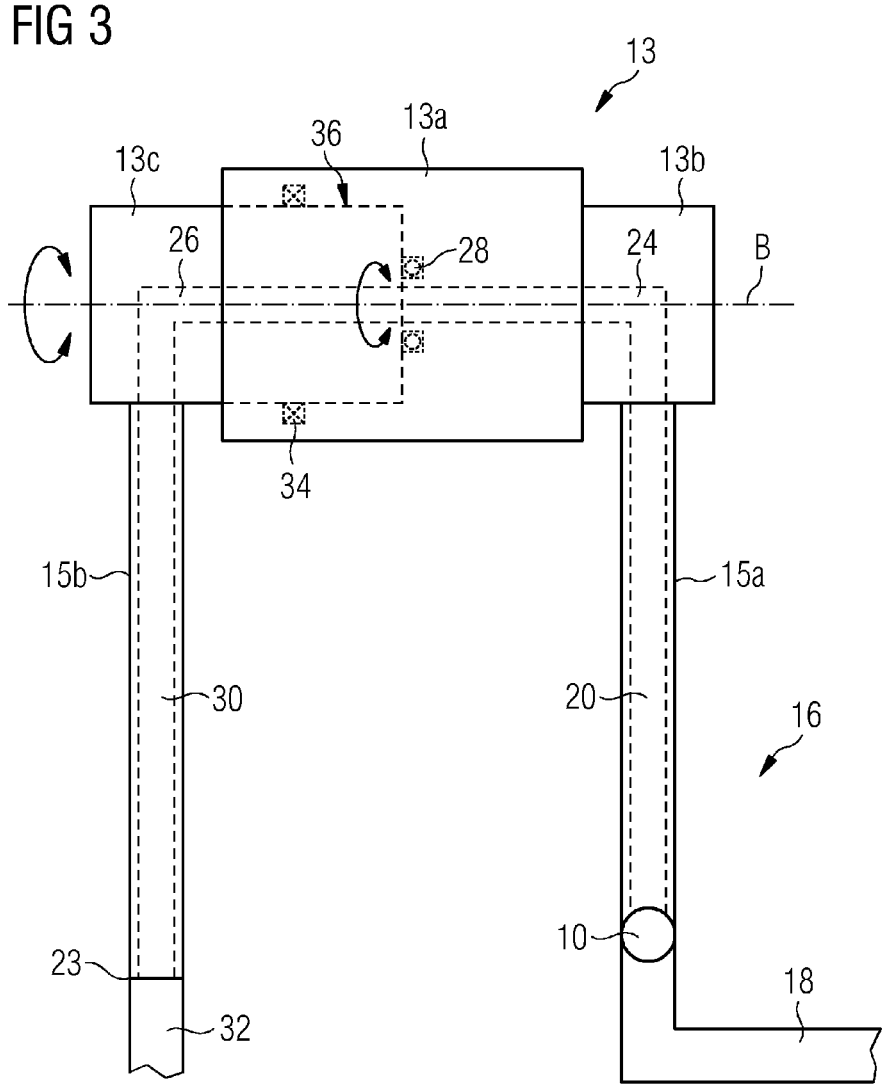

FIG. 1 shows an embodiment of a wind turbine according to the invention in a state of operation, FIG. 2 shows the same wind turbine in a state of maintenance, FIG. 3 shows a detailed view of a rotary unit and of a part of a transport system according to an embodiment of the invention.

In the drawings, like reference numbers refer to like objects throughout. Objects in the diagrams are not necessarily drawn to scale.

DETAILED DESCRIPTION OF THE INVENTION

FIG. 1 shows a wind turbine 1 with a nacelle 5 and a rotor 8. The rotor 8 comprises a hub 7 and rotor blades (not shown), which can be inserted into openings 9 within the hub 7. The nacelle 5 is positioned on top of a tower 3. At its inside it comprises inside surfaces 12, 14, i.e. a bottom floor 12 and a ceiling 14. On the bottom floor 12 there is positioned a pump 11 for hydraulic or pneumatic fluid such as hydraulic oil.

The wind turbine 1 is realized as a direct drive wind turbine with a generator 22 which directly transfers the rotational energy of the rotation of the hub 7 into electrical energy. The generator 22 comprises a stator 21 and a generator rotor 19 which generator rotor 19 is moved rotatingly along bearings 25 relative to the stator 21. Due to the movement of the generator rotor 19 which is directly connected to the hub 7 electric current is induced in the windings of the stator 21 which electric current can then be transferred to users. Between the nacelle 5 and the hub 7 there is an interface region 17. This interface region 17 extends from a division line $D_1$ which is defined by the end of the outside limits of the nacelle 5 both into the nacelle 5 and into the hub 7 about 0.5 meters.

In this interface region 17 there is positioned a rotary unit 13; in fact, the division line $D_1$ passes through the rotary unit 13. The rotary unit 13 is part of a transport system 16 for the hydraulic oil which is pumped into the direction of the hub (to a hydraulic pitch system—not shown) by the pump 11 or which may also be pumped back into the nacelle 5 from the hub 7. The transport system 16 in the region of the interface 17 comprises flexible pipes (not shown) which are integrated into two spacers 15a, 15b which both lead to the rotary unit 13. The rotary unit 13 has a rotation axis B along which a rotatable (i.e. rotating in operation, in other words: non-stationary) part of the rotary unit 13 is rotated together with the rotation of the hub 7. This rotatable part (which will be shown in detail in the context of FIG. 3) is positioned at the left hand side of the drawing and directed towards the hub 7, whereas a stationary part of the rotary unit 13 is positioned in the direction of the nacelle 5 (at the right hand side of the figure).

The rotation axis B of the rotary unit 13 corresponds with the rotation axis A of the rotor 8 and thus of a drive train of the wind turbine 1. That drive train is basically realized by a connection of the hub 7 with the generator rotor 19 of the generator 22. The spacer 15b which is positioned in the direction of the hub 7 comprises a coupling 23 which can be connected and disconnected if necessary. The coupling 23 also connects and disconnects parts of the transport system 16 in the region of the spacer 15b. The other spacer 15a which is directed towards the nacelle 5 comprises a hinge 10 with a tilting axis C which is perpendicular to the plane of this figure so that the viewer looks into the figure along or parallel to this axis C. Furthermore, there is attached a rotation sensor 27 at the rotary unit 13 which is also orientated along the rotation axis A of the rotor 8.

The rotary unit 13 which transfers hydraulic or pneumatic fluid from the pump 11 into the hub 7 for the operation of the pitch system in the hub 7 is thus positioned in the interface region 17 at a particular point of the wind turbine 1: here, the stationary parts of the wind turbine 1, i.e. the non-rotatable parts, such as the nacelle 5 and the tower 3 are divided along a second division line $D_2$ from the rotatable parts of the wind turbine 1, i.e. the rotor 8 with its components. The second division line D2 extends through the interface region 17 and then turns and goes through the gap between the stator 21 and the generator rotor 19. On the other side of the second division line $D_2$, the rotatable part of the rotation unit 13 together with the spacer 15b which is directed towards the hub 7 are positioned.

FIG. 2 shows the same wind turbine 1 in a state of maintenance in which staff want to pass from the nacelle 5 into the hub 7. For that purpose, the spacer 15a has been tilted away along the tilting axis C of the hinge 10 into the direction of the nacelle 5. The coupling 23 has been disconnected so that it was possible to remove the second spacer 15b from its original position as shown in FIG. 1. The rotary unit 13 is now positioned near the bottom floor 12. Therefore, staff can easily pass through the interface region 17 without being hindered by the rotary unit 13 which does not stand in the way any more.

FIG. 3 depicts an example of a rotary unit 13 as can be used in the context of the invention and which is thus shown as part of a transport system 16 according to an embodiment of the invention. The transport system 16 comprises a first metal pipe 18 leading from a pump (cf. FIGS. 1 and 2) to a hinge 10 by which it is connected to a first spacer 15a inside of which a first flexible pipe 20 extends into the rotary unit 13. From the rotary unit 13 a second spacer 15b with a second flexible pipe 30 inside extends down to a second metal pipe 32. A coupling 23 connects the second spacer 15b with the second metal pipe 32 such that via the coupling 23 the second flexible pipe 13 is firmly connected to the second metal pipe 32. With reference to FIG. 2 it can be seen that by disconnecting the coupling 23 the connection between the second flexible pipe 30 and the second metal pipe 32 can be disconnected as well. Preferably the coupling 23 is realized such that upon disconnection both ends of the second flexible pipe 30 and of the second metal pipe 32 are firmly closed so that no fluid inside any of the two pipes 30, 32 will come into the environment.

The rotary unit 13 comprises essentially three parts: a first stationary part 13a, a second stationary part 13b, and a rotatable part 13c. The first stationary part 13a and the second stationary part 13b are firmly connected to each other and contain a first channel 24 leading from the first flexible pipe 20 in the direction of the rotatable part 13c. The rotatable part 13c is rotatable around the rotation axis B along bearings 34 inside a cavity 36 of the first stationary part 13a. At the end of the cavity 36 in the direction of the second stationary part 13b, i.e. in the direction downstream towards the pump 11, there is an O-ring 28 which seals the connection between the first channel 24 and the rotatable part 13c. Corresponding to the first channel 24 in the stationary parts 13a, 13b there is a second channel 26 inside the rotatable part 13c which leads from the interface to the first channel 24 to the second flexible pipe 15b.

This means that from the pump 11 in the direction of the second metal pipe 32 there is a transport way for hydraulic or pneumatic fluid going through the first metal pipe 18, the first flexible pipe 20, the first channel 24, the second channel 26, the second flexible pipe 30 into the second metal pipe 32. The second metal pipe 32 leads further inside a hub 7 to a hydraulic pitch system as mentioned before.

It may be understood that such transport system 16 may comprise different elements and/or different outlays of elements, in particular concerning the pipes and the channels as well as the connections between rotatable parts and stationary parts. For instance, the metal pipes 18, 32 may also be realized as plastic pipes, be it flexible or non-flexible. Instead of using spacers 15a, 15b with flexible pipes 20, 30 inside of them one can also make to use of pipes of a solid material which also function as spacers at the same time. The construction, positioning and alignment of the channels 24, 26 as well as the connection of the channels 24, 26 within the rotary unit 13 can also be altered according to need and space.

Although the present invention has been disclosed in the form of preferred embodiments and variations thereon, it will be understood that numerous additional modifications and variations other than those mentioned could be made thereto without departing from the scope of the invention.

For the sake of clarity, it is to be understood that the use of "a" or "an" throughout this application does not exclude a plurality, and "comprising" does not exclude other steps or elements.

LIST OF REFERENCE SIGNS 1 wind turbine
3 tower
5 nacelle
7 hub
8 rotor
9 openings
10 hinge
11 pump
12 inside surface—bottom floor
13 rotary unit 13
13a first stationary part
13b second stationary part
13c rotatable part
14 inside surface—ceiling
15a, 15b spacers
16 transport system
17 interface region
18 first metal pipe 18
19 generator rotor
20 first flexible pipe
21 stator
22 generator
23 coupling
24 first channel
25 bearings
26 second channel
27 rotation sensor
28 O-ring
30 second flexible pipe
32 second metal pipe
34 bearings
36 cavity
A rotation axis (rotor)
B rotation axis (rotary unit)
C tilting axis
$D_1$ first division line
$D_2$ second division line

The invention claimed is:

1. A wind turbine, comprising:
a rotor comprising a plurality of blades and a hub,
a nacelle connected to the hub in an interface region so that a drive train extends from the hub into the nacelle;
a transport system configured to transporting fluid from the nacelle into the hub,
wherein the transport system comprising a rotary unit positioned in the interface region, a first part of the rotary unit is rotatable together with the hub and a second part of the rotary unit is stationary, the fluid is transported through the rotary unit,
wherein the fluid is hydraulic fluid and/or pneumatic fluid,
wherein the rotation axis of the rotary unit is positioned at a rotation axis of the drive train, and
wherein the rotary unit is connected to the nacelle and/or to the hub via a spacer which projects from a fixed point at the nacelle and/or at the hub to the rotation axis of the drive train.

2. The wind turbine according to claim 1,
wherein the wind turbine is as a direct drive wind turbine with the drive train directly connecting the rotor with a generator.

3. The wind turbine according to claim 1,
wherein the spacer comprises a solid part.

4. The wind turbine according to claim 1,
wherein the spacer is tiltable around a tilting axis which is angular to the rotation axis of the rotary unit.

5. The wind turbine according to claim 1,
wherein in a state of operation of the wind turbine the spacer is positioned at an inner surface of the nacelle and/or of the hub projecting in the direction of the rotation axis of the drive train.

6. The wind turbine according to claim 1,
wherein within the region of the interface the transport system comprises a flexible pipe arranged in at least one side of the nacelle and/or the hub.

7. The wind turbine according to claim 6,
wherein the flexible pipe is led through at least one spacer which projects from a fixed point at the nacelle and/or at the hub into the direction of the rotation axis of the drive train.

8. The wind turbine according to claim 1,
wherein the transport system comprises a coupling in the region of the interface which coupling is connectable and disconnectable.

9. The wind turbine according to claim 1,
wherein in the region of the rotary unit, an additional unit with a designated function different from the function of the rotary unit is directly attached to the rotary unit.

10. The wind turbine according to claim 1,
wherein in the region of the rotary unit, an additional unit with a designated function different from the function of the rotary unit is indirectly attached to the rotary unit.

* * * * *